UNITED STATES PATENT OFFICE.

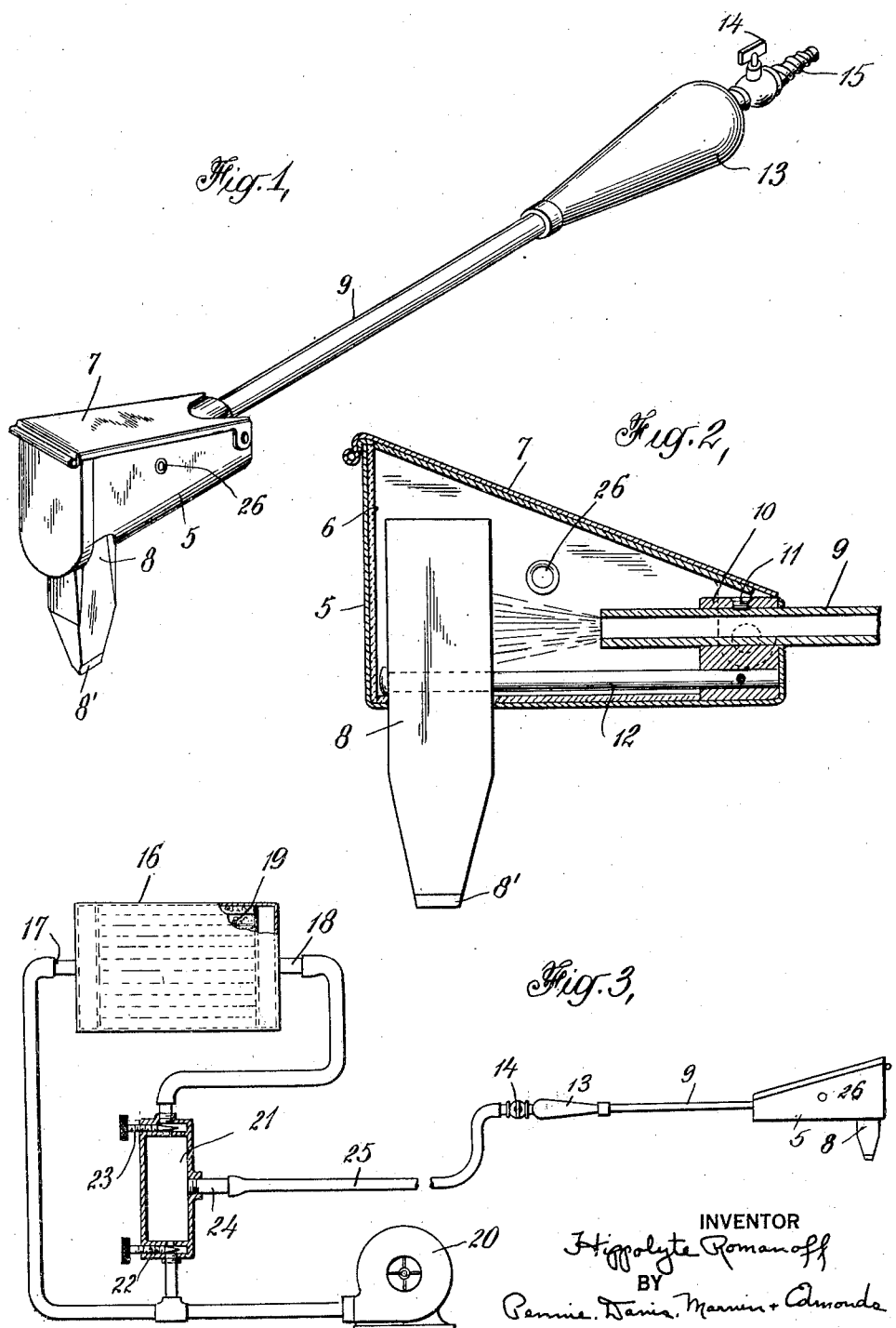

HIPPOLYTE ROMANOFF, OF NEW YORK, N. Y.

SOLDERING-TOOL.

1,357,425.

Specification of Letters Patent.

Patented Nov. 2, 1920.

Application filed May 14, 1919. Serial No. 297,085.

*To all whom it may concern:*

Be it known that I, HIPPOLYTE ROMANOFF, a subject of Russia, residing at New York city, in the county of New York, State of New York, have invented certain new and useful Improvements in Soldering-Tools; and I do hereby declare the following to be a full, clear, and exact description of the invention, such as will enable others skilled in the art to which it appertains to make and use the same.

This invention relates to self heating soldering irons, and has for its object the provision of an improved soldering iron of this type. More particularly, the invention relates to an improved portable soldering outfit comprising in combination the improved self heating soldering iron of the invention and an improved source of fuel therefor.

The novel features of the invention which I believe to be patentable are definitely set forth in the appended claims. These features together with the construction and mode of operation of the soldering outfit embodying the same will be best understood from the following description taken in conjunction with the accompanying drawings; in which, Figure 1 is a perspective view of the improved soldering iron of the invention;

Fig. 2 is a sectional view of the soldering iron; and

Fig. 3 is a diagrammatic view of the soldering outfit embodying the features of the invention.

My improved soldering iron comprises a housing 5 made of metal or other suitable material and provided with an interior lining 6 of heat insulating material, such, for example, as asbestos. The housing is of greater cross sectional area at one end than at the other, and in general is of elongated configuration. The housing is closed by a hinged cover 7, also lined with heat insulating material, as shown in Fig. 2 of the drawing.

The soldering implement proper consists of a mass of metal 8 having relatively high specific heat conductivity and considerable heat storage capacity. Copper is well suited for the soldering implement. The soldering implement is mounted with the bulk of its mass within the housing 6, and is arranged so that the soldering tip or point 8' extends exteriorly of the housing.

A fuel conduit 9 extends through the end of smallest sectional area of the housing and has its outlet directed toward and in proximity to the mass of metal 8. The small end of the housing is closed by a plug 10, and the conduit 9 extends through an opening in this plug. The plug and conduit are rigidly secured together by means of a screw 11. A rod 12 is rigidly secured at one end to the plug 10 and at its other end is secured to the soldering implement 8, and serves to rigidly secure the latter to the plug. It will thus be seen that the conduit 9 and plug 10 constitute in effect a rigid support for the housing and the soldering implement. The conduit further serves as a handle for the soldering tool and is provided with a hand grip 13 to facilitate manipulation of the tool. Behind the grip 13 is a valve 14 for controlling the flow of fuel through the conduit 9, and behind the valve is a coupling 15 for connecting the conduit 9 to a suitable source of gaseous fuel.

For heating the soldering iron, I prefer to use a mixture of liquid combustible vapor and air such as is obtained by the apparatus described in my application Serial No. 297,084, filed concurrently herewith. In Fig. 3 of the drawing I have diagrammatically indicated this source of gaseous fuel operatively connected to my improved soldering iron. The apparatus for generating or developing the mixture of liquid combustible vapor and air is in effect a combustible gas accumulator and comprises a receptacle 16 having an air inlet 17 at one end and a combustible gas mixture outlet 18 at its other end. Within the receptacle 16 is arranged an absorbent or porous medium 19, which is preferably composed of a plurality of layers of compressed wood fiber, originally in the form of shavings, as described in my aforementioned application. The inlet opening 17 is connected to a blower 20, and the gaseous fuel outlet 18 is connected to a mixing chamber 21. The mixing chamber 21 is also connected to the air blower 20. A valve 22 controls the amount of air admitted to the chamber 21, while a similar valve 23 controls the amount of gaseous fuel admitted to this chamber. The outlet opening 24 of the mixing chamber is connected by a suitable pipe or hose 25 with the coupling 15 of the fuel conduit 9.

In operation, the porous medium 19 is impregnated to saturation with a liquid combustible, such, for example as benzin or gasolene. The blower 20 is then started, and a current of air is forced through the porous medium 19. The vapor of the liquid combustible mixes with the air and passes out the opening 18 into the chamber 21, and thence into the conduit 9. The gaseous fuel mixture is ignited at the exit end of the conduit, within the housing 5, and an intensely hot blast of flame is directed against the metallic mass of the soldering implement. The products of combustion may escape through the joints between the hinged cover 7 and the body of the housing, or, if desired an opening 26 may be provided in the housing for the exhaust of these products of combustion.

The construction of my improved soldering iron is simple and compact, and when used in conjunction with the special source of gaseous fuel herein described the soldering implement can be raised to the soldering temperature in two or three minutes. The complete soldering outfit is portable and can be carried from place to place and is of particular advantage under conditions or circumstances where it is difficult or impossible to obtain commercial gaseous fuel for a self heating iron. By regulation of the three valves 14, 22 and 23 the heating of the iron can be very delicately controlled, thus enabling the continuous use of the iron for various kinds of soldering, and without loss of time due to under-heating or over-heating of the soldering implement.

I claim:—

1. A self heating soldering iron comprising a housing of varying sectional area, a hinged cover for said housing, a lining of heat insulating material for the housing and cover, a soldering implement mounted within said housing near the end of greatest sectional area and having a soldering point exterior of the housing, and a fuel conduit extending into said housing through the end of smallest sectional area and having its outlet directed toward and in proximity to said implement.

2. A self heating soldering iron comprising a housing, a plug for supporting said housing independently of the soldering implement, a soldering implement rigidly secured to said plug and positioned within said housing and having a soldering point extending exteriorly of the housing and a fuel conduit extending through said plug into the housing and being rigidly secured to the plug.

3. A self heating soldering outfit comprising a housing, a soldering implement mounted within said housing and having a soldering point exterior of the housing, a fuel conduit extending into said housing and having its outlet directed toward and in proximity to said implement, a receptacle having an air inlet opening and an outlet opening, a porous medium made up of a plurality of superposed layers of absorbent material mounted within said receptacle, and means connecting said fuel conduit to said outlet opening.

4. A self-heating soldering iron comprising a fuel conduit, a soldering implement rigidly supported from said conduit, and a housing inclosing the end of the fuel conduit and a portion of the soldering implement and being also rigidly supported from the fuel conduit so that both the soldering implement and housing are supported from the fuel conduit independently of each other, the fuel conduit having its outlet toward and in proximity to said soldering implement.

5. A self-heating soldering iron comprising a housing of varying sectional area, a soldering implement mounted within the housing near the end of greatest sectional area, and having a soldering point exterior of the housing, a fuel conduit extending into the housing through the end of smallest sectional area, and having its outlet directed toward and in proximity to said implement, means for supporting the soldering implement from the fuel conduit, the housing being also supported from the fuel conduit so that both the soldering implement and housing are supported by the fuel conduit independently of each other.

6. A self-heating soldering iron comprising a housing of varying sectional area, a soldering implement mounted within the housing near the end of greatest sectional area, and having a soldering point exterior of the housing, a fuel conduit extending into the housing through the end of smallest sectional area, and having its outlet directed toward and in proximity to said implement, means for supporting the soldering implement from the fuel conduit, the housing being also supported from the fuel conduit, and a hinged cover associated with said housing.

7. A self-heating soldering iron comprising a housing, a lining of heat insulating material for the housing, a fuel conduit extending into the housing at one end thereof, and a soldering implement mounted within the housing and inclosed thereby save at the end adjacent the soldering point.

In testimony whereof I affix my signature.

HIPPOLYTE ROMANOFF.